United States Patent Office 3,499,014
Patented Mar. 3, 1970

3,499,014
17-HYDROXYALKYNYLATION PROCESS
Francisco Alvarez, Palo Alto, Calif., assignor to Syntex Corporation, Panama, Panama, a corporation of Panama
No Drawing. Filed Aug. 14, 1967, Ser. No. 660,202
Int. Cl. C07c *167/20, 169/08*
U.S. Cl. 260—397.4                                                11 Claims

ABSTRACT OF THE DISCLOSURE

17β-hydroxy-17α-alk-1'-ynyl steroids are prepared from 17-keto steroids and an alkynylating complex consisting of a 1-alkyne, an alkali metal hydride, and an aprotic organic solvent with a high dielectric constant.

---

The present invention relates to a novel process for preparing 17β-hydroxy-17α-alk-1'-ynyl steroids from the corresponding 17-keto steroids.

The present invention is directed to the preparation of 17β-hydroxy-17α-alk-1'-ynyl steroids from the corresponding 17-keto steroids by a novel process which comprises allowing a 17-keto steroid to react with an alkynylating complex, consisting of a 1-alkyne, an alkali metal hydride and an aprotic organic solvent with a high dielectric constant.

The present process can be illustrated by the following reaction scheme showing only the "D" ring of the steroid nucleus:

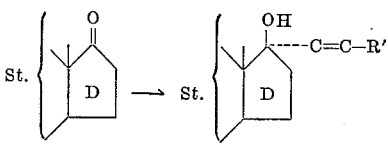

where St. represents a steroid residue; $R^1$ is hydrogen, fluoro, chloro, (lower)alkyl or substituted (lower)alkyl; and the five-membered ring is the D ring of the steroid molecule.

Surprisingly, by the novel process of the present invention, 17-keto steroids are selectively alkynylated with the alkynes of 2 or 3 or more than 3 carbon atoms to obtain the corresponding 17α-alk-1'-ynyl-17β-hydroxy steroids. Accordingly, 3,17-diketo-$\Delta^1$ steroids, 3,17-diketo-$\Delta^4$ steroids, and the like, are selectively alkynylated at the 17 position without the need of protecting the conjugated 3-keto group, whereas known conventional methods of alkynylation with alkynes of 3 or more carbon atoms or reagents thereof are not selective and will alkynylate not only the 17-keto group but also conjugated keto groups.

Furthermore, the present novel process is a general alkynylating process, that is, 17α-alk-1'-ynyl groups of from 2 to 8 carbon atoms can be selectively introduced into a 17-keto steroid in high yields with very little if any, production of side products.

Accordingly, by the present novel process 17β-hydroxy-17α-prop-1'-ynylestr-4-en-3-one, 17β-hydroxy-17α-prop-1'-ynylestr-5(10)-en-3-one, 17β-hydroxy-17α-ethynylestr-4-en-3-one, 17β-hydroxy-17α-ethynylestr-5(10)-en-3-one, 17β-hydroxy-17α-ethynyl-6α-methylestr-4-en-3-one, and 17β-hydroxy-17α-prop-1'-ynyl-6α-methylestr-4-en-3-one, which are known progestational agents, are prepared directly from the corresponding 17-keto steroids in surprisingly high yields and in excellent quality.

Similarly, 3,17β-dihydroxy-17α-ethynylestra-1,3,5(10)-triene, 3-methoxy-17β-hydroxy-17α-ethynylestra-1,3,5(10)-triene, 3,17β-dihydroxy-17α-prop-1'-ynylestra-1,3,5(10)-triene, and 3-methoxy-17β-hydroxy-17α-prop-1'-ynylestra-1,3,5(10)-triene, which are known estrogenic agents, are selectively prepared from the corresponding 17-keto steroids by the present process.

The present novel process is conducted by treating a 17-keto steroid with an alkynylating complex consisting of a 1-alkyne, an alkali metal hydride and an aprotic organic solvent with a high dielectric constant. The addition is either accomplished by adding a 17-keto steroid to the alkynylating complex or by adding the alkynylating complex to the 17-keto steroid. Preferably the mixture is stirred during the addition.

The addition is carried out at temperatures of from about 0° C. to about 50° C., conveniently at room temperature, under anhydrous conditions. After the addition, the resulting alkynylating reaction mixture is allowed to stand for a period of time of from about one-half hour to about 12 hours or more.

Advantageously, two molar equivalents, and preferably more, of the alkynylating complex, based upon the moles of alkali metal hydride used in preparing the complex, is used per molar equivalent of 17-keto steroid, and generally about 1.5 to about 5.0 molar equivalents are used.

Optionally, additional 1-alkyne can be added to the alkynylating reaction mixture during the alkynylating reaction period. In some situations the yield of the 17α-alk-1'-ynyl-17β-hydroxy compound is increased by the continued addition of the 1-alkyne. Obviously the 1-alkyne added is the same 1-alkyne employed in preparing the alkynylating complex.

Preferably the 17-keto steroid is dissolved in an anhydrous inert organic solvent, preferably an aprotic organic solvent with a high dielectric constant, prior to the addition. Optionally, an anhydrous inert organic solvent can be used in conjunction with the aprotic solvent as a co-solvent for the 17-keto steroid. Co-solvents are used in portions of about 1:1 to about 10:1 by volume of aprotic solvent: organic solvent.

Any non-aqueous, preferably anhydrous, organic aprotic solvent with a high dielectric constant, that is, a solvent with a dielectric constant greater than 38 ($\epsilon > 38$), is utilized in the present process. Typical solvents include dialkylsulfoxides such as dimethylsulfoxide, diethylsulfoxide; N,N-dialkyl carboxylic acid amides, such as N,N-dimethylformamide, N,N-dimethylacetamide; and the like, preferably dimethylsulfoxide.

Typical anhydrous inert organic solvents that can be used with the aprotic organic solvents as co-solvents include diethylether, tetrahydrofuran, dioxane, hexane, cyclohexane, and the like.

The product of the novel process, the 17β-hydroxy-17α-alk-1'-ynyl steroid, is isolated by conventional techniques. For example, the alkynylating reaction mixture is neutralized or made slightly acidic by the addition of an aqueous acidic mixture. Suitable aqueous mixtures consist of aqueous mineral acids such as hydrochloric acid, sulfuric acid, phosphoric acid, and the like; or aqueous hydrocarbon carboxylic acids such as formic acid, acetic acid, oxalic acid, and the like; or aqueous acidic inorganic salts such as ammonia chloride, ammonia sulfate, ferric chloride, and the like. The aqueous acidic solution consists of about 1% to about 15% by weight acid or salt.

The neutralized or acidified mixture is diluted with water, and the product is filtered off, dissolved in an organic solvent immiscible with water, washed with water to neutrality, and dried. The product can be further purified by conventional techniques, such as recrystallization, chromatography, and the like.

The alkynylating complex is prepared by adding a 1-alkyne to a mixture of an alkali metal hydride in an anhydrous, aprotic organic solvent with a high dielectric constant. The addition is carried out at temperatures of from about −30° C. to about 50° C., and conveniently at room temperature under anhydrous conditions. Preferably the addition is carried out with stirring.

At least two molar equivalents of the 1-alkyne are added per molar equivalent of alkali hydride present in the mixture and generally about 2.5 to about 5.0 molar equivalents of the 1-alkyne are added.

At the completion of the addition the alkynylating complex mixture is allowed to stand for about 30 minutes to about 6 hours, usually about one hour, before being utilized as described hereinbefore.

The addition of about 1 mg. of triphenyl methane to the alkali metal hydride mixture yields a red-colored mixture, and when all the alkali metal hydride has been permitted to react with the 1-alkyne, the mixture becomes colorless. Thus the use of organic color indicators affords a convenient method of knowing when all the alkali metal hydride has been combined with the 1-alkyne to yield the alkynylating complex.

Suitable 1-alkynes employed in the preparation of the alkynylating complex can be represented by the following formula:

$$R^1-C\equiv CH \qquad (I)$$

wherein $R^1$ is hydrogen, fluoro, chloro, (lower)alkyl or substituted (lower)alkyl. By the term "lower alkyl" is meant straight or branch chain hydrocarbons of from 1 to 5 carbon atoms. Typical (lower)alkyls or substituted (lower)alkyls include methyl, ethyl, propyl, iso-propyl, t-butyl, chloromethyl, difluoromethyl, trifluoromethyl, trichloromethyl, dichloroethyl, and the like, preferably methyl.

Sodium hydride, potassium hydride, and lithium hydride, preferably sodium hydride, are the alkali metal hydrides employed in the preparation of the alkynylating complex.

Suitable anhydrous aprotic organic solvents employed in the preparation of the alkynylating complex are described hereinabove.

A wide variety of 17-keto steroids are used as starting steroids in the present process. The starting steroid can contain, besides the 17-keto group, a wide variety of other substituents elsewhere in the molecule, such as alkyl groups, halogen groups, hydroxy groups, ether groups, and the like, at the C–1, C–2, C–3, C–6, C–7, C–9, C–10, C–11, C–14, C–15, C–16 and C–19 positions and the like. The 17-keto starting steroid can optionally be unsubstituted at various positions in the molecule such as between the C–1,2, C–3,4 C–4,5, C–5,10, C–5,6, C–9,10, C–9,11, C–11,12 carbon atoms, and the like.

Keto groups with $\alpha,\beta$ or $\beta,\gamma$ unsaturation, such as the 3-keto group found in 3,17-diketo-$\Delta^4$ steroids, 3,17-diketo-$\Delta^{5(10)}$ steroids and the like, or sterically hindered keto groups, such as the 11-keto group found in 11,17-diketo steroids, 3,11,17-triketo-$\Delta^1$ steroids, and the like are not affected by the present novel process.

Of course, other keto groups or aldehyde groups on the 17-keto steroid, that is, those groups which are not $\alpha,\beta$ or $\beta,\gamma$ unsaturated or sterically hindered, are protected such as through the selective formation of ketal groups, or other such protecting groups known to the art, prior to the present novel process.

Among the suitable 17-keto starting steroids are steriods of the androstane series and estrane series. Typical 17-keto steroids include 3-hydroxyestra-1,3,5(10)-trien-17-one,
3-methoxyestra-1,3,5(10)-trien-17-one,
3-ethoxyestra-1,3,5(10)-trien-17-one,
androst-4-ene-3,17-dione,
estr-5(10)-ene-3,17-dione,
androst-5-ene-3,17-dione,
androst-4-ene-3,11,17-trione,
androst-1-ene-3,17-dione,
estr-4-ene-3,17-dione,
6α-methylandrost-4-ene-3,17-dione,
18-methylestr-4-ene-3,17-dione,
estra-4,9(10),11-triene-3,17-dione,
18-methylestra-4,9(10),11-triene-3,17-dione,
estra-5(10)-en-3β-ol-17-one,
estr-5-en-3β-ol-17-one,
estr-5-ene-3,17-dione,
6α-methylestr-4-ene-3,17-dione,
3β-methoxyestra-2,5(10)-dien-17-one,
4β-methylandrost-4-ene-3,17-dione,
3,3-dimethoxyestr-5(10)-en-17-one,
1β,3β-dihydroxyestra-1,3,5(10)-trien-17-one,
3β-methoxy-1β-methylestra-1,3,5(10)-trien-17-one,
3-acetoxyestr-4-en-17-one,
3,3-dimethoxyestr-5(10)-en-17-one,
3,3-ethylenedioxyestr-5(10)-en-17-one,
3β-methoxyestra-1,3,5(10),6,8-pentaen-17-one,
3β-methoxyestra-2,5(10)-dien-17-one,
3β-ethoxyestra-2,5(10)-dien-17-one, and the like.

When 17-keto steriods having the 3-keto-$\Delta^5$ or 3-keto-$\Delta^{5(10)}$ configuration (for example, such configurations are present on the 17-keto steroids) are utilized as the starting 17-keto steroids in the present process, the corresponding 17β-hydroxy-17α-alk-1'-ynyl steroids with the 3-keto-$\Delta^4$ configuration are obtained as the products.

For example, when 6α-methylestr-5(10)-ene-3,17-dione is utilized as a 17-keto starting steroid in the present process, 6α-methyl-17β-hydroxy-17α-alk-1'-ynylestr-4-en-3-one is obtained as the product.

In order to preserve the 3-keto-$\Delta^5$ or 3-keto-$\Delta^{5(10)}$ configuration of 3,17-diketo-$\Delta^5$ steroids and 3,17-diketa-$\Delta^{5(10)}$ steroids during the present novel process, the keto group is transformed prior to the process to a ketal by techniques well-known to the art. For example, treating estra-5(10)-ene,3,17-dione with ethanol in the presence of an acid catalyst, 3,3-diethoxyestr-5(10)-en-17-one is obtained. In order to protect the ketal group during isolation, the reaction media should either be neutralized with a dilute acid solution, and preferably with an acidic salt solution. After the product of the above novel process has been isolated, the ketal group can be selectively hydrolyzed by techniques well-known to the art, such as with an aqueous 90% methanolic-oxalic solution at room temperature to obtain the free keto group with $\beta,\gamma$ unsaturation.

If the alkylynating reaction mixture is acidified with an aqueous mineral acid or an aqueous organic acid, ketal groups and also enol ethers, are hydrolyzed. Thus, for example, enol ether steroids such as 3-ethoxy-$\Delta^{3,5}$ steroids or 3,3-dimethoxy-$\Delta^{5(10)}$ steroids, are hydrolyzed at this stage to the corresponding 3-keto steroids, such as to 3-keto-$\Delta^4$ steroids for the two examples given above. Thus, when the starting steroid bears an enol ether or ketal, either as a result of previous and specific information as described above, or when formed in the course of previous synthetic routes, as for example the product of a Birch reduction regeneration of the keto group can occur concomitantly in the coarse of the present novel process.

The following examples will serve to further typify the nature of this invention, but as these are presented solely for purposes of illustration, they should not be considered as a limitation on the scope of applicability of the invention.

EXAMPLE 1

At room temperature, prop-1-yne is bubbled through a red-colored mixture of sodium hydride (1 g.), dimethylsulfoxide (25 ml.) and triphenylmethane (1 mg.). When the mixture becomes colorless, the addition of propyne is stopped. To this mixture, the alkynylating complex, is added a solution of estr-5(10)-ene-3,17-dione (1 g.) and dimethylsulfoxide (5 ml.). The resulting mixture is stirred for one hour at room temperature, and then it is poured into an aqueous 5% sulfuric acid solution. The product, 17β-hydroxy-17α-prop-1'-ynylestr-4-3-one, comes out of solution; the solid is filtered off and added to a 1% hydrochloric acid:methanol solution (50 ml.) and refluxed for 30 minutes. The product is precipitated out with the addition of water, filtered off, added to 50 ml. of methylene chloride, washed with water to neutrality, dried over sodium sulfate and evaporated under reduced pressure to yield 17β-hydroxy-17α-prop-1'-ynylestr-4-3-one.

Similarly, by utilizing acetylene, 3,3,3-trifluoroprop-1-yne and phenylethyne in place of propyne in the above process, the following are respectively prepared: 17β-hydroxy-17α-ethynylestr-4-en-3-one, 17β-hydroxy-17α-(3',3',3'-tri-fluoroprop-1'-ynyl)estr-4-en-3-one, and 17β-hydroxy-17α-(β-phenylethynyl)estr-4-en-3-one.

EXAMPLE 2

A mixture of 1 g. of potassium hydride, 20 ml. of dimethylsulfoxide and 1 ml. of triphenylmethane is saturated with ethyne until the mixture becomes colorless. A mixture of 2 g. of estr-5(10)-ene-3,17-dione and 10 ml. of dimethyl sulfoxide is added to the above mixture with stirring. The alkynylating reaction mixture is stirred for an additional 3 hours at room temperature. The alkynylating reaction mixture is then carefully neutralized to a pH of 7 with a 5% aqueous sulfuric acid solution. The neutralized mixture is extracted with methylene chloride; the extracts are combined, washed with water to neutrality, dried over sodium sulfate, and evaporated to yield 17β-hydroxy-17α-ethynylestr-4-en-3-one. The mixture is recrystallized from hexane:acetone.

In a like manner, 17β-hydroxy-17α-propyn-1'-ylestr-4-en-3-one is obtained by using propyne in place of ethyne in the above process.

EXAMPLE 3

A mixture of 10 g. of sodium hydride, 200 ml. of dimethylsulfoxide and 1 mg. of triphenylmethane is saturated with propyne until the mixture becomes colorless. A solution of 20 g. of estr-4-ene-3,17-dione and 100 ml. of dimethylsulfoxide is added to the mixture with stirring. The reaction mixture is allowed to sit for 2 hours, then it is poured into 1 liter of 5% aqueous sulfuric acid. The produce precipitates out, it is filtered off, added to 100 ml. of carbontetrachloride, washed with water to neutrality, dried over magnesium sulfate, and evaporated under vacuum. The residue is recrystallized from hexane:acetone to yield 17β-hydroxy-17α-prop-1'-ynylestr-4-en-3-one, which is identical to that isolated in Example 1.

In a like manner, 17β-hydroxy-17α-ethynylestra-4-en-3-one and 17β-hydroxy-17α-but-1'-ynylestra-4-en-3-one are obtained by using acetylene and 1-butyne, respectively, in place of the propyne in the above process.

By replacing sodium hydride with lithium hydride in the above procedure, the same product in substantially the same yield is obtained.

EXAMPLE 4

A mixture of 100 g. of 6α-methylandrost-4-ene-3-17-dione in 1.5 liters of dimethylsulfoxide is added to a suspension of 120 g. of sodium hydride in 800 ml. of dimethylsulfoxide which has been saturated with 250 g. of 1-propyne. The reaction mixture is saturated with a slow stream of 1-propyne for an additional hour; the reaction mixture is then stirred for 4 hours at room temperature; the reaction mixture is then added to an aqueous solution of 10% acetic acid. The precipitate thus obtained is collected by filtration and taken up in 1.5 liters of ethanol containing 15 ml. of concentrated hydrochloric acid. The mixture is refluxed for 5 minutes, cooled and evaporated under vacuum. The residue is taken up in 1.0 liter of methylene chloride, washed with water to neutrality, dried over sodium sulfate and evaporated under vacuum to yield 6α-methyl-17α-prop-1'-ynyl-17β-hydroxyandrose-4-3-one.

EXAMPLE 5

Part A

One gram of 3α,3β-dimethoxyestr-5(10)-en-17-one is added to an alkynylating complex consisting of 1 g. of sodium hydride, 2 g. of ethyne and 25 ml. of dimethylsulfoxide. The mixture is stirred and allowed to stand for 1 hour at room temperature. The reaction mixture is then neutralized with 50 ml. of an aqueous 10% ammonia chloride solution; then the reaction mixture is diluted with 100 ml. of water and extracted with diethylether. The ether extracts are combined, washed to neutrality with water, dried over sodium sulfate and evaporated under reduced pressure to yield 3α,3β-dimethoxy-17β-hydroxy-17α-ethynylestr-5(10)-ene.

Part B

3α,3β - dimethoxy - 17β-hydroxy-17α-prop-1'-ynylestr-5(10)-ene is prepared from 3α-3β-dimethoxyestr-5(10)-en-17-one by the method of the above process where the alkynylating complex consists of 1 g. of sodium hydride, 25 ml. of methyl sulfoxide and 3 g. of propyne.

Part C

The following 17-keto steroids are similarly alkynylated by the methods of Processes A and B as is 3α,3β-dimethoxyestr-5(10)-en-3-one to obtain the corresponding 17β - hydroxy - 17α-ethynyl or 17β-hydroxy-17α-prop-1'-ynyl steroids, 3-hydroxy-1,3,5(10)-trien-17-one, 3-methoxyestra-1,3,5-(10)-trien-17-one, 3-ethoxyestra-1,3,5(10)-trien - 17 - one, 3-acetoxyestr-4-en-17-one, androst-4-ene-3,17 - diol, 3,3 - dimethoxyestr-5(10)-en-17-one, 3,3-diethoxyestr-5(10)-en-17-one, 3,3-ethylenedioxyestr-5(10)-en - 17 - one, 3-methoxyestra-2,5(10)-dien-17-one, or 3-ethoxyestra-2,5(10)-dien-17-one.

Part D

The product of Part A is taken up in 100 ml. of aqueous 90% methanol containing 1 g. of oxalic acid. The mixture is allowed to stand for one hour at room temperature; then it is diluted with 100 ml. of water and extracted with diethylether. The ether extracts are combined, washed with water to neutrality, dried over sodium sulfate and evaporated to dryness to yield 17β-hydroxy-17α-ethynylestr-5(10)-en-3-one.

Similarly, 17β - hydroxy - 17α-prop-1'-ynylestr-5(10)-en-3-one is prepared from the product of Part B by the method of the above process.

EXAMPLE 6

150 grams of 3,3 - dimethoxyestr - 5(10)-en-17-one is added to alkynylating complex consisting of a mixture of 50 g. of sodium hydride, 1 liter of dimethylsulfoxide and 5 mg. of triphenyl methane, which is saturated with ethyne until the mixture is colorless. The reaction mixture is stirred for 2 hours at room temperature and then acidified with an aqueous 10% ammonium chloride solution. The acidified mixture is evaporated under reduced pressure. The residue is added to an acidic mixture of 1000 ml. of methanol, 100 ml. of water and 10 g. of oxalic acid; the resulting mixture is stirred at room temperature for 5 hours and poured into water; then it is extracted with several portions of diethylether. The extracts are combined, washed with water to neutrality, dried over sodium sulfate and evaporated under reduced pressure to yield 17β - hydroxy - 17α-ethynestr-5(10)-en-3-one.

Similarly, 17β-hydroxy-17α-ethynestr-5(10)-en-3-one is obtained from 3,3-diethoxyestr-5(10)-en-17-one by the above process.

What is claimed is:
1. A process for the preparation of 17β-hydroxy-17α-alk-1'-ynyl steroids from the corresponding 17-keto steroids which comprises treating the 17-keto steroid with an alkynylating complex consisting of a 1-alkyne, an al- kali metal hydride and an aprotic organic solvent with a high dielectric constant.

2. The process according to claim 1 wherein the 17-keto steroid is treated with about two molar equivalents to about five molar equivalents of the alkynylating complex.

3. The process according to claim 2 wherein the alkali metal hydride is sodium hydride and the aprotic organic solvent with a high dielectric constant is dimethylsulfoxide.

4. The process according to claim 3 wherein the 17-keto steroid is a steroid of the 17-keto androstane series, and the 1-alkyne is propyne.

5. The process according to claim 3 wherein the 17-keto steroid is a steroid of the 17-keto estrane series; and the 1-alkyne is propyne.

6. The process according to claim 3 wherein the 17-keto steroid is estr-5(10)-ene-3,17-dione; the 17β-hydroxy-17α-alk-1′-ynyl steroid is 17β-hydroxy-17α-prop-1′-ynylestr-4-en-3-one; and the 1-alkyne is propyne.

7. The process according to claim 3 wherein the 17-keto steroid is estr-4-ene-3,17-dione; the 17β-hydroxy-17α-alk-1′-ynyl steroid is 17β-hydroxy-17α-prop-1′-ynylestr-4-en-3-one; and the 1-alkyne is propyne.

8. The process according to claim 3 wherein the 17-keto steroid is 6α-methylestr-4-ene-3,17-dione; the 17β-hydroxy-17α-alk-1′-ynyl steroid is 6α-methyl-17β-hydroxy-17α-prop-1′-ynylestr-4-en-3-one; and the 1-alkyne is propyne.

9. The process according to claim 3 wherein the 17-keto steroid is 3-hydroxyestra-1,3,5(10)-trien-17-one, 3-methoxyestra-1,3,5(10)-trien-17-one, 3-ethoxyestra-1,3,5-(10)-trien-17-one, 3-acetoxyestr-4-en-17-one, androst-4-ene-3,17-dione, 3,3-dimethoxyestr-5(10)-en-17-one, 3,3-diethoxyestr-5(10)-en-17-one, 3,3-ethylenedioxyestr-5(10)-17-one, estr-5(10)-ene-3,17-dione, or estr-4-ene-3,17-dione; the 17β-hydroxy-17-α-alk-1′-ynyl steroid is 3,17β-dihydroxy-17α-ethynylestra-1,3,5(10)-triene, 3-methoxy-17β-hydroxy-17α-ethynylestra-1,3,5(10)-triene, 3-ethoxy-17β-hydroxy-17α-ethynylestra-1,3,5(10)-triene, 3-acetoxy-17β-hydroxy-17α-ethynylestr-4-ene, 17β-hydroxy-17α-ethynylandrost-4-en-3-one, 3,3-dimethoxy-17β-hydroxy-17α-ethynylestr-5(10)-ene, 3,3-diethoxy-17β-hydroxy-17α-ethynylestr-5(10)-ene, 3,3-ethylenedioxy-17β-hydroxy-17α-ethynylestr-5(10)-ene, 17β-hydroxy-17α-ethynylestr-4-en-3-one, or 17β-hydroxy-17α-ethynylestr-4-en-3-one respectively; and the 1-alkyne is acetylene.

10. The process according to claim 4 wherein the 17-keto steroid is 3-hydroxyestra-1,3,5(10)-trien-17-one, 3-methoxyestra-1,3,5(10)-trien-17-one, 3-ethoxyestra-1,3,5(10)-trien-17-one, 3-acetoxyestr-4-en-17-one, androst-4-ene-3,17-dione, 3,3-dimethoxyestr-5(10)-en-17-one, 3,3-diethoxyestr-5(10)-en-17-one, or 3,3-ethylenedioxyestr-5(10)-en-17-one; the 17β-hydroxy-17α-alk-1′-ynyl steroid is 3,17β-dihydroxy-17α-prop-1′-ynylestra-1,3,5(10)-triene, 3-methoxy-17β-hydroxy-17α-prop-1′-ynylestra-1,3,5(10)-triene, 3-ethoxy-17β-hydroxy-17α-prop-1′-ynylestra-1,3,5(10)-triene, 3-acetoxy-17β-hydroxy-17α-prop-1′-ynylestr-4-ene, 17β-hydroxy-17α-prop-1′-ynylandrost-4-en-3-one, 3,3-dimethoxy-17β-hydroxy-17α-prop-1′-ynylestr-5(10)-ene, 3,3-diethoxy-17β-hydroxy-17α-prop-1′-ynylestr-5(10)-ene, or 3,3-ethylenedioxy-17β-hydroxy-17α-prop-1′-ynylestr-5(10)-ene respectively; and the 1-alkyne is propyne.

11. The process for the preparation of 17β-hydroxy-17α-prop-1′-ynyl steroids from the corresponding 17-keto steroids which comprises treating the 17-keto steroid with about 2 molar equivalents to about 5 molar equivalents of an alkynylating complex consisting of propyne, sodium hydride, and dimethylsulfoxide.

References Cited

UNITED STATES PATENTS

| | | | |
|---|---|---|---|
| 3,126,376 | 3/1964 | Robinson | 260—239.55 |
| 3,332,968 | 7/1967 | Joly et al. | 260—397.3 |
| 3,391,165 | 7/1968 | Hughes et al. | 260—397.3 |
| 3,265,718 | 8/1966 | Christiansen | 260—397.5 |

LEWIS GOTTS, Primary Examiner

ETHEL G. LOVE, Assistant Examiner

U.S. Cl. X.R.

260—999, 239.55, 397.5, 397.45

UNITED STATES PATENT OFFICE
CERTIFICATE OF CORRECTION

Patent No. 3,499,014                     Dated March 3, 1970

Inventor(s) Francisco Alvarez

It is certified that error appears in the above-identified patent and that said Letters Patent are hereby corrected as shown below:

Column 1, lines 32 to 37 should appear as follows:

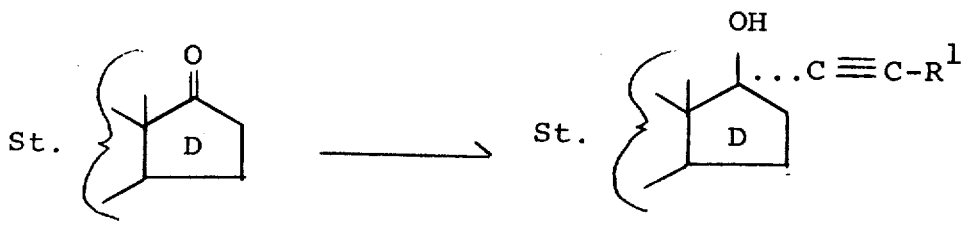

Column 5, line 8, "4-3-one." should read --4-en-3-one.--.

Column 5, line 74, "hydroxyandrose-4-" should read --hydroxyandrost-4- --.

Column 6, line 19, "3α-3β" should read --3α,3β--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents